US011208183B2

(12) United States Patent
Diaz et al.

(10) Patent No.: US 11,208,183 B2
(45) Date of Patent: Dec. 28, 2021

(54) EPIRB HAVING RETENTION CARRIAGE STRAP FOR HANDS FREE CARRIAGE

(71) Applicants: Francisco Diaz, Deerfield Beach, FL (US); Ricardo Raimondo, Lauderhill, FL (US); Marlon Pinder, Boynton Beach, FL (US); Thomas Pack, Boca Raton, FL (US)

(72) Inventors: Francisco Diaz, Deerfield Beach, FL (US); Ricardo Raimondo, Lauderhill, FL (US); Marlon Pinder, Boynton Beach, FL (US); Thomas Pack, Boca Raton, FL (US)

(73) Assignee: ACR ELECTRONICS, INC., Fort Lauderdale, FL (US)

( * ) Notice: Subject to any disclaimer, the term of this patent is extended or adjusted under 35 U.S.C. 154(b) by 877 days.

(21) Appl. No.: 14/728,384

(22) Filed: Jun. 2, 2015

(65) Prior Publication Data

US 2016/0358448 A1    Dec. 8, 2016

(51) Int. Cl.
*B63C 9/00* (2006.01)
*B63B 22/00* (2006.01)
*G01S 5/02* (2010.01)
*G08B 25/01* (2006.01)

(52) U.S. Cl.
CPC .............. *B63C 9/00* (2013.01); *B63B 22/00* (2013.01); *G01S 5/0231* (2013.01); *B63C 2009/0017* (2013.01); *G08B 25/016* (2013.01)

(58) Field of Classification Search
CPC  B63C 9/00; B63C 9/0005; B63C 9/13; B63C 9/155; B63C 9/21; B63C 9/20; B63C 11/02; B63C 9/18; B63C 2009/0017; B63B 22/003; B63B 22/00; G08B 25/016; G08B 21/02; G08B 21/088; G01S 5/0231; G01S 19/17; G01S 5/16; A61B 5/0002; H05K 7/02; H05K 7/06; A43C 1/06; F16M 11/10; H01Q 3/08; A62L 33/00; B60J 11/02; H04B 11/00; B62B 5/068; G04G 21/04; A62B 3/00; A62B 1/08; A63B 29/021
USPC ......................................................... 342/385
See application file for complete search history.

(56) References Cited

U.S. PATENT DOCUMENTS 2,565,523 A * 8/1951 Russell, Jr. ............ H04B 1/034
                                                          455/99
3,265,152 A * 8/1966 Kass ........................ G10K 9/10
                                                          181/142
3,290,642 A * 12/1966 Russell, I ............. G10K 11/006
                                                          367/4
(Continued)

FOREIGN PATENT DOCUMENTS

WO    WO-2014168907 A1 * 10/2014 ........... G08B 21/088

*Primary Examiner* — Vladimir Magloire
*Assistant Examiner* — Nuzhat Pervin
(74) *Attorney, Agent, or Firm* — Malin Haley DiMaggio & Bowen, P.A.

(57) ABSTRACT

An emergency position indicating radio beacon that includes a waterproof rigid housing, antenna, a retention carriage strap securely mounted around its exterior periphery on a spool in a storage position. In an emergency the user can unwind the retention carriage strap and form an adjustable loop in the strap using hook and loop fasteners to firmly attach the strap connected to the EPIRB housing to the user's arm that allows a user to transport the radio beacon with the retention carriage strap in a hands-free configuration.

9 Claims, 6 Drawing Sheets

(56) References Cited

U.S. PATENT DOCUMENTS

| | | | | |
|---|---|---|---|---|
| 4,286,690 A * | 9/1981 | Gastine | A62B 1/08 | 182/5 |
| 4,668,200 A * | 5/1987 | Kotoh | B63C 9/21 | 206/305 |
| 4,932,910 A * | 6/1990 | Hayday | B63C 9/21 | 441/11 |
| 4,981,453 A * | 1/1991 | Krishan | B63B 22/003 | 248/309.1 |
| 5,102,360 A * | 4/1992 | Eycleshimer | B63C 9/02 | 206/803 |
| 5,176,421 A * | 1/1993 | Fasiska | B60J 11/02 | 150/166 |
| 5,192,238 A * | 3/1993 | Brown | B63C 9/00 | 441/84 |
| 5,218,366 A * | 6/1993 | Cardamone | B63C 9/21 | 200/549 |
| 5,367,296 A * | 11/1994 | Schell | B63C 9/21 | 340/984 |
| 5,710,989 A * | 1/1998 | Flood | B63C 9/0005 | 200/61.05 |
| 5,813,891 A * | 9/1998 | McNamee | B63C 9/081 | 441/108 |
| 5,886,635 A * | 3/1999 | Landa | B63C 9/0005 | 340/573.6 |
| 6,505,575 B1 * | 1/2003 | Ciari | A63B 29/021 | 116/209 |
| 7,226,038 B1 * | 6/2007 | Wickstrom | B66D 1/54 | 254/276 |
| 7,455,257 B1 * | 11/2008 | Kaleta | B63C 11/02 | 242/397.3 |
| 7,612,686 B1 * | 11/2009 | Bustamante | H04B 13/02 | 340/425.1 |
| 8,154,444 B1 * | 4/2012 | Edward | G01S 19/17 | 342/357.55 |
| 8,413,763 B2 * | 4/2013 | Hermann | A62B 3/00 | 182/18 |
| 9,092,956 B2 * | 7/2015 | Secord | G08B 5/002 | |
| 9,144,168 B2 * | 9/2015 | Sedillo | A45F 5/00 | |
| 9,162,738 B1 * | 10/2015 | Faletra | B63B 7/08 | |
| 2001/0024949 A1 * | 9/2001 | Yanagida | H04M 11/04 | 455/404.2 |
| 2002/0097157 A1 * | 7/2002 | Piri | G01S 5/0231 | 340/573.1 |
| 2004/0155818 A1 * | 8/2004 | Barras | H01Q 1/273 | 343/700 MS |
| 2004/0157514 A1 * | 8/2004 | Courtney | B63C 9/1255 | 441/88 |
| 2006/0108756 A1 * | 5/2006 | Kerr | B62B 5/068 | 280/33.992 |
| 2006/0270290 A1 * | 11/2006 | Tellew | B63C 9/18 | 441/88 |
| 2007/0076527 A1 * | 4/2007 | Romano | H04B 11/00 | 367/134 |
| 2007/0241155 A1 * | 10/2007 | Trajkovic | H01Q 3/08 | 224/579 |
| 2009/0023421 A1 * | 1/2009 | Parkulo | A62B 9/006 | 455/404.2 |
| 2009/0121931 A1 * | 5/2009 | Katz | G01S 5/0231 | 342/357.55 |
| 2010/0154860 A1 * | 6/2010 | Fereday | F24S 30/48 | 136/245 |
| 2010/0243783 A1 * | 9/2010 | Hermann, II | A62B 99/00 | 242/377 |
| 2012/0094561 A1 * | 4/2012 | Raven | B63C 9/08 | 441/80 |
| 2012/0105223 A1 * | 5/2012 | Weil | A45F 5/00 | 340/539.11 |
| 2012/0312348 A1 * | 12/2012 | Fereday | F24S 25/10 | 136/245 |
| 2013/0214942 A1 * | 8/2013 | Joss | B63C 9/0005 | 340/984 |
| 2013/0235546 A1 * | 9/2013 | Sedillo | A45F 5/00 | 361/809 |
| 2014/0062660 A1 * | 3/2014 | Secord | G01S 5/16 | 340/6.1 |
| 2014/0159960 A1 * | 6/2014 | Mueller | G01S 1/68 | 342/385 |
| 2016/0058130 A1 * | 3/2016 | Boney | A61G 1/044 | 24/712.6 |

\* cited by examiner

EPIRB HAVING RETENTION CARRIAGE STRAP FOR HANDS FREE CARRIAGE

BACKGROUND OF THE INVENTION

Field of the Invention

This invention relates to an emergency position indicating radio beacon (EPIRB) for locating emergency victims utilizing an emergency satellite network, and specifically to an EPIRB having a self-contained exteriorly wrapped retention carriage strap for hands-free retention and carriage of the EPIRB during an emergency.

Description of Related Art

The use of an EPIRB for emergency signaling by a person on a vessel in distress is well known in the marine industry. Typically an EPIRB is an RF transmitter that emits signals on one or more frequencies, normally an emergency band frequency such as 406 MHz, to notify satellites, surrounding ships, and aircraft in the area the location of a vessel in trouble. An EPIRB can be either manually activated or automatically activated by contact with ocean or fresh water. An emergency communication system worldwide is established using satellites that can receive EPIRB emergency signals that are used to notify emergency recovery crews such as the United States Coast Guard. EPIRBs are used in the Cospas-Sarsat system, an international system for search and rescue. An EPIRB can bulky and heavy for a person to carry, often requiring both hands.

It often becomes necessary for a person dealing with a marine emergency on site to include actions requiring physical transport of an EPIRB. In such a situation it would be desirable for the person transporting an EPIRB to have one or both hands free. For example a user leaving a sinking vessel in transit to a raft would be more mobile with one or both hands free while carrying an EPIRB. In such an emergency it is critical that the person be able to be in a hands-free condition because of having to deal with the immediate rescue operations. In such situations, it would be desirable for a person involved in the emergency to have a retaining device to allow carriage of an EPIRB hands free.

The invention described herein provides an EPIRB in which the rigid waterproof outer housing of the device includes a spool and retention carriage strap attached thereto that can be used for wrapping the retention strap about a limb of the user while one strap end is attached directly to a portion of the exterior periphery of the EPIRB housing. The housing spool also may include an additional safety line (required by the Coast Guard) that can be wound around the spool for storage. The retention carriage strap and safety line are stored on the spool together, conveniently out of the way on the EPRIB exterior housing until the time of use when either or both can be rapidly deployed.

SUMMARY OF THE INVENTION

An emergency position indicating radio beacon (EPIRB) having a rigid waterproof housing and an exterior, centrally located spool peripherally disposed around said housing, and an extendible flexible retention carriage strap stored around the spool and connected to the EPIRB housing with a security cord.

The EPIRB housing has a cylindrical base with a flat bottom, a central cylindrical exterior area above the base that includes a recessed cylindrical portion having parallel ridges defining the spool, an upper cylindrical area above said central spool area, and a substantially flat top surface that includes a center raised portion for receiving an antenna.

The flat flexible retention strap is stored tightly wound around the spool at the central exterior area of the EPIRB housing. A safety line required by the Coast Guard with an EPIRB is also wound around the spool and stored beneath the retention carriage strap. The retention strap includes strategically located surface areas of hook and loop fasteners on one side for manually forming adjustable loops of different diameters for securing the strap comfortably around a user's arm or tightly to the EPIRB housing spool for storage. In some of the embodiments, starting at one end of the strap on one side, half of the strap length would have hook fasteners, and the second half of the strap on the same side would have loop fasteners. The strap has a first buckle at one free end, and the opposite end is fed through a second buckle forming a loop. The free end is enlarged with the first buckle to prevent the strap from becoming disengaged from the second buckle. The hook and loop surface areas can be manually connected in a variety of different diameter loops when the free end of the strap is doubled back over the buckle against the strap surface itself. This makes for an extremely tight fit when the strap is wrapped around itself and the spool in the storage position.

The EPIRB rigid housing contains the necessary circuitry for generating emergency signals for transmission by an antenna that is connected through the housing top surface. The housing also contains a battery power supply to provide operating power to the emergency signal generating circuitry all of which is conventional in operation.

The retention strap may be constructed of a synthetic fabric such as nylon or other strong durable fabric. The length of the retention strap is long enough and in conjunction with the hook and loop fasteners disposed on one side of the strap to form an adjustable loop around the arm of a person carrying the EPIRB in an emergency environment such as a sinking vessel so that the person is hands-free while retaining the EPIRB. The retention strap is narrow enough to fit in the spool when wrapped around the housing spool tightly for storage. The strap also protects and hides the safety line stored below it on the spool. The safety line may be any length or a specific length as maybe required by any government regulation for EPIRBs.

In an emergency, a person transporting an EPIRB would separate the retention strap hook and loop fasteners to disengage the first strap end from the spool. The other end of the retention strap is tied to the EPIRB housing exterior with a security cord. The user can form a loop in the retention strap with the first buckle around a desired portion of the person's arm to participate hands-free in other emergency activities without releasing the device. The safety line can also be deployed or loosened from around the spool for use in the emergency.

It is an object of the invention to provide an emergency position indicating radio beacon (ERPIB) with a retention strap to allow the user to carry or retain the radio beacon so that the user can remain one or more hands-free during the emergency.

It is another object of the invention to provide an emergency position indicating radio beacon with a retention strap spool on the exterior of the housing for storing a retention strap for use during an emergency and a safety line for use in when necessary in an emergency.

PREFERRED EMBODIMENT OF THE INVENTION

Figure 1:
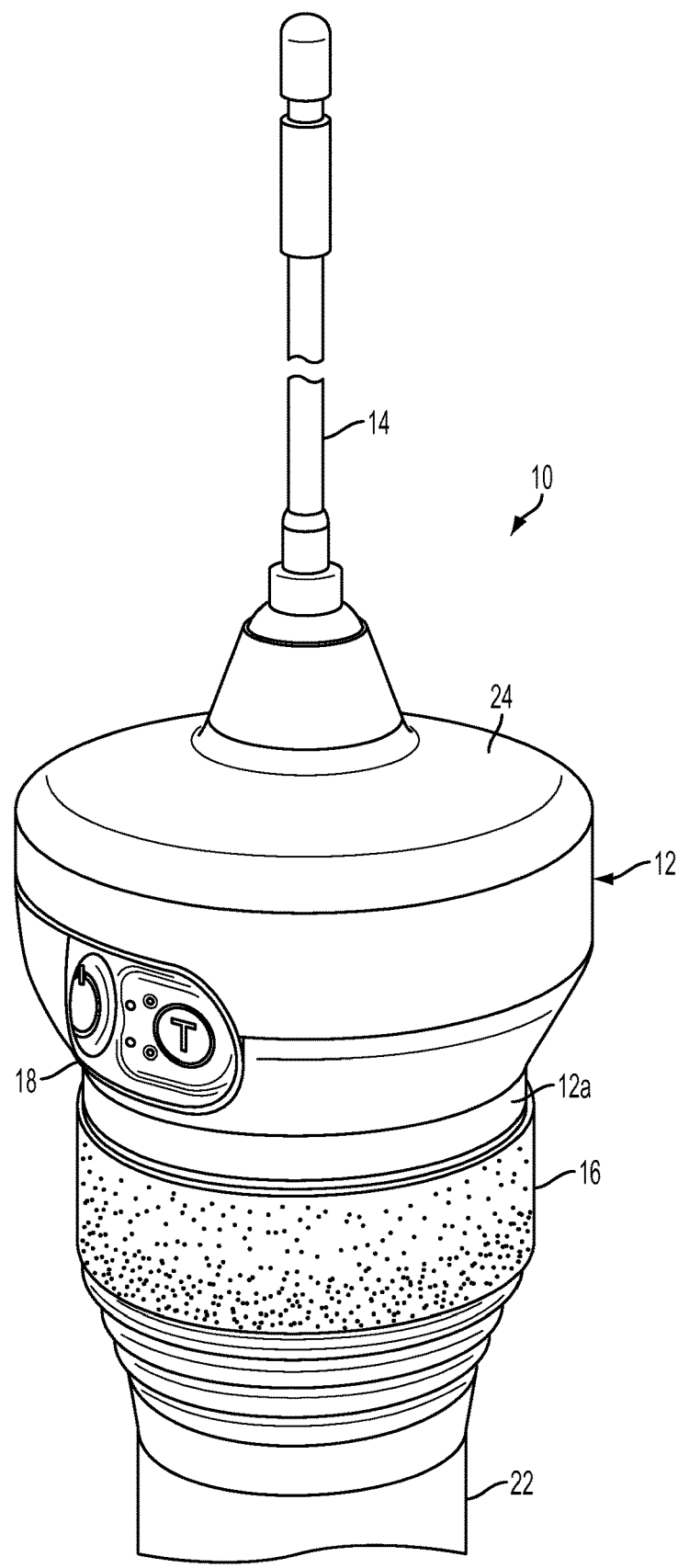
FIG. 1 shows a forward perspective view of the invention.

Referring now to the drawings and in particular FIG. 1, the invention 10 is shown that includes an emergency position indicating radio beacon (EPIRB) 12 having a retention carriage strap 16 tightly wound around spool 20 mounted on EPIRB housing 12a as stored when not in use. The EPIRB 12 has an antenna 14 and an emergency signal activating switch panel 18 which includes a push button for activating the EPIRB emergency transmitter and a second button (T) for testing the device. There is also a clear plastic safety cover to prevent accidental activation of the transmitter.

Figure 2:
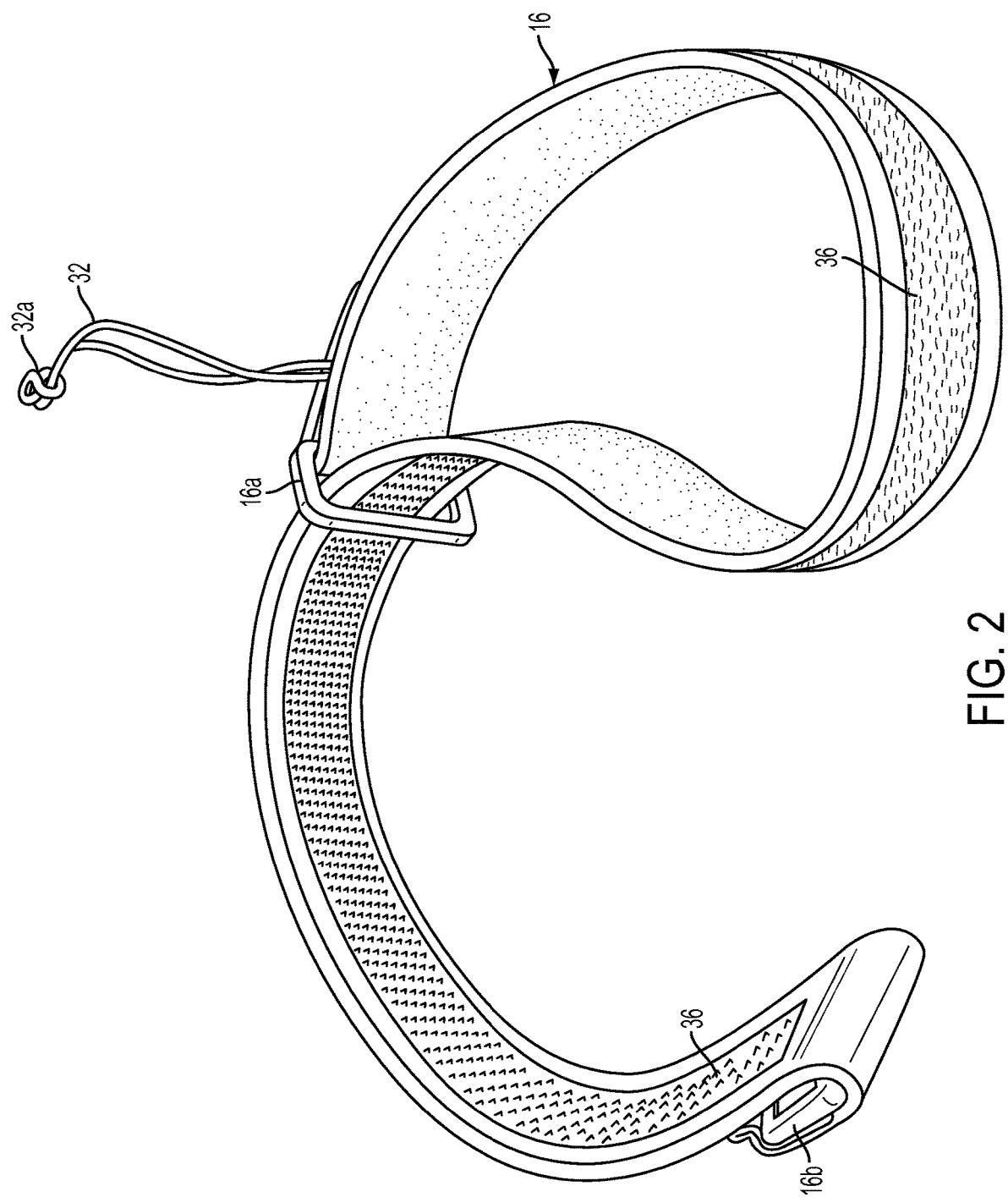
FIG. 2 shows a perspective view of the retention carriage strap by itself.

The retention carriage strap 16 is shown in FIG. 2 separated from EPIRB 12 for illustration purposes. The strap 16 includes a pair of buckles 16a and 16b that allow the strap 16 to be manually shaped into loops for attaching the strap 16 to the arm of a user, permitting the user to be one or both hands-free in an emergency while still securing and moving the EPIRB from one location to another. Buckle 16b is mounted at one end of the strap 16 to ensure that the end of the strap 16 does not pass through buckle 16a in order to maintain the strap loop configuration. The retention carriage strap 16 is firmly attached at one end (without the buckle 16b) to a security cord 32 that itself is tied with loop 32a through eye 34 (FIG. 6) on the exterior of the EPIRB housing.

The strap 16 adjustment structure to change the loop diameter when necessary is important so that a user can quickly custom fit the restraining strap 16 to the user's arm in an emergency. One side of the strap 16 has approximately equal longitudinal strips of hook and loop fasteners 36a and 36b positioned in-line as shown in FIG. 2. When used with buckle 16a, the free end of strap 16 is manually positioned to align the strap hook fasteners 36a with a portion of the loop fasteners 36b to create a strap 16 loop of a particular diameter to firmly fit on the arm of a user in an emergency. The strap hook and loop fasteners 36a and 36b are also very important to tightly wind the strap 16 around the spool 20 in the storage position, out-of-the-way. The storage configuration of the strap 16 being firmly in tightly wound around the spool 20 and EPIRB periphery is especially important because, hopefully, the EPIRB will not be used during its lifetime. Therefore the strap 16 should remain tightly wound around the EPIRB for years during storage. Therefore the structure and arrangement of the hook and loop fabric fasteners on one side of the strap 16 are extremely important.

The free end buckle 16b prevents the free end of the strap 16 from passing through buckle 16a. Buckle 16a is important in order to manually fold the free end segment of the strap 16 over upon itself to engage the loop fasteners to the hook fasteners to form a sturdy strap loop for engagement with a user's arm. The strap 16 could also be used to firmly attach the EPIRB to an object if required.

The strap 16 is rectangular in shape in some embodiments and approximately 18 inches long and approximately 1 inch in width. The thickness is approximately an eighth to a quarter of an inch in some embodiments.

The retention strap 16 includes hook and loop fasteners 36a and 36b on one side of the strap 16. The hook and loop fasteners allow the strap 16 to be looped by a user for emergency use or to be wrapped tightly in the storage position on the EPIRB housing spool.

A security cord 32 is firmly secured to one end of strap 16 and is also secured to a connecting eye 34 (FIG. 4) formed on the peripheral surface of the EPIRB housing 12 so that the retention strap 16 cannot separate from the housing 12 when the strap 16 is deployed by a user in an emergency.

Figure 3:
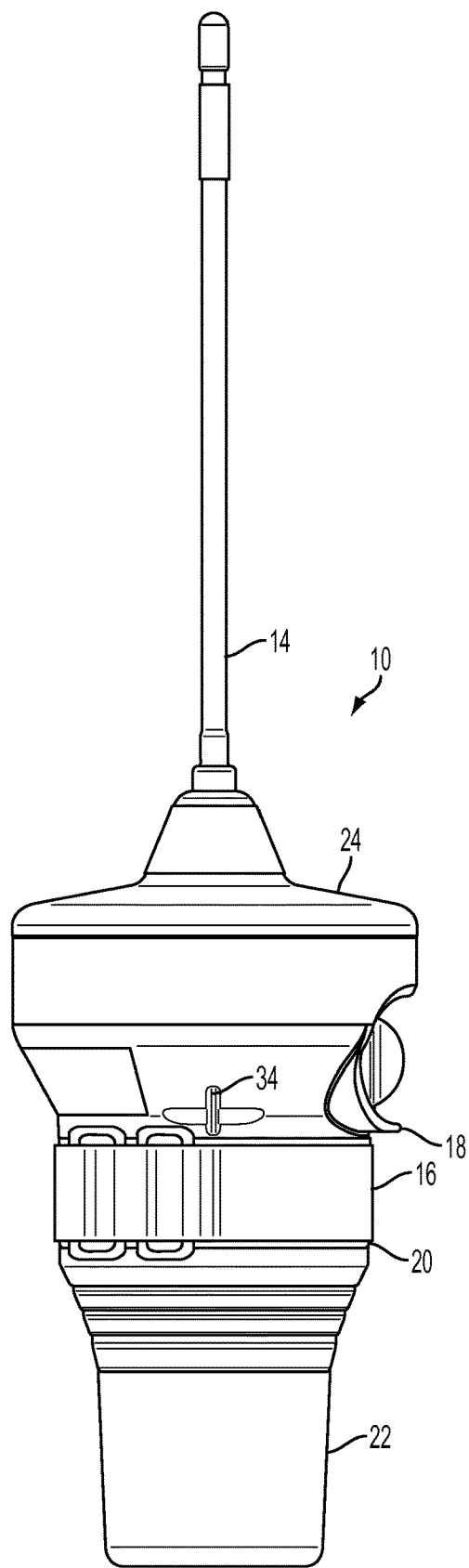
FIG. 3 shows a right side elevational view of the invention.

In the configuration shown in FIG. 3 the retention strap 16 is tightly wound and stored on and around spool 20 that is mounted around the mid-exterior portion of the EPIRB waterproof housing. By having a strong, durable synthetic fabric strap 16 that can be manually formed into a loop of variable size diameter for attachment to a user's arm, a user in an emergency can secure the strap 16 to an arm of the user's body and transport the EPIRB with both hands-free or one hand free, safely and securely in an emergency.

Figure 4:
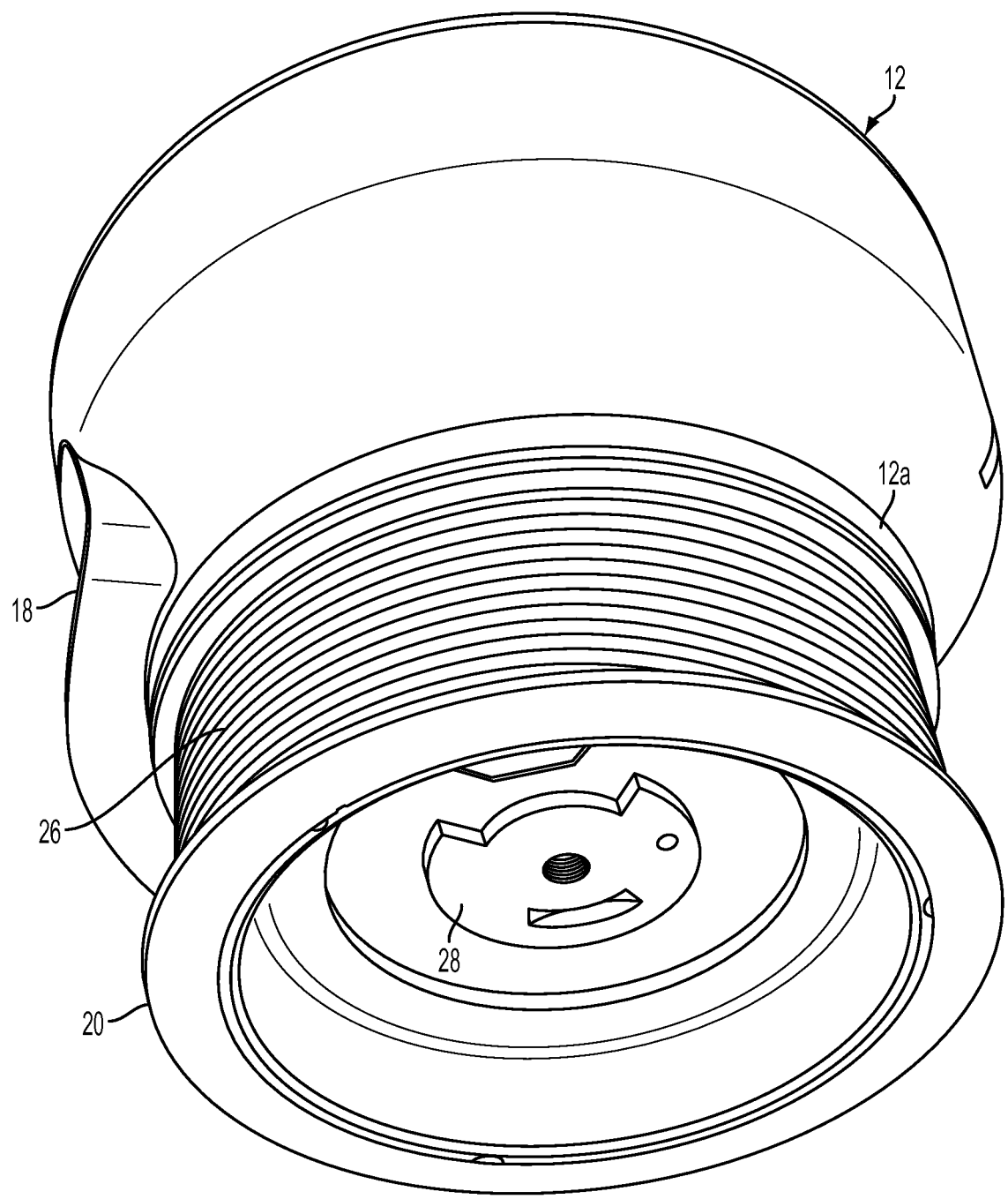
FIG. 4 shows a left side bottom perspective view of a portion of the ERPIB housing that includes a safety line and spool that can receive a carriage strap.

FIG. 4 shows a central portion of the EPIRB housing that includes a spool 20 and a safety line 26 wrapped about spool 20 which is connected to the housing 28. The EPIRB base housing section of the EPIRB housing has been removed to show the spool 20 and the safety line 26 wrapped around the spool 20. The spool 20 is mounted around the EPIRB housing. In FIG. 4 the retention strap 16 shown in FIG. 2 has been removed for illustration.

In the storage position, the strap 16 is wound tightly over safety line 26 on spool 20. The spool 20 is used primarily to store the strap 16 and the safety line 26 out of the way around the EPIRB housing 12 when the EPIRB is not in use.

Figure 5:
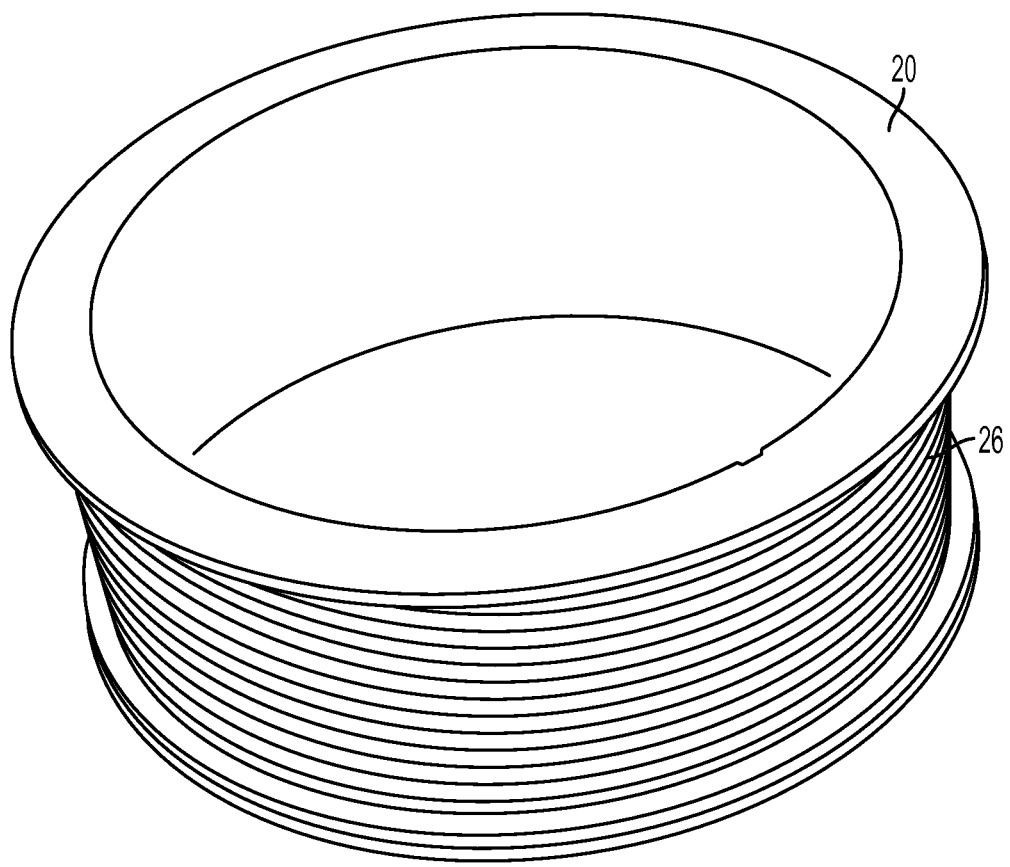
FIG. 5 shows a perspective view of the spool and line without the retention strap.

FIG. 5 shows spool 20 by itself with the safety line 26 wrapped around spool 20 body in a stored configuration. The line 26 can be removed when necessary and used in an emergency after strap 26 is removed.

Figure 6:
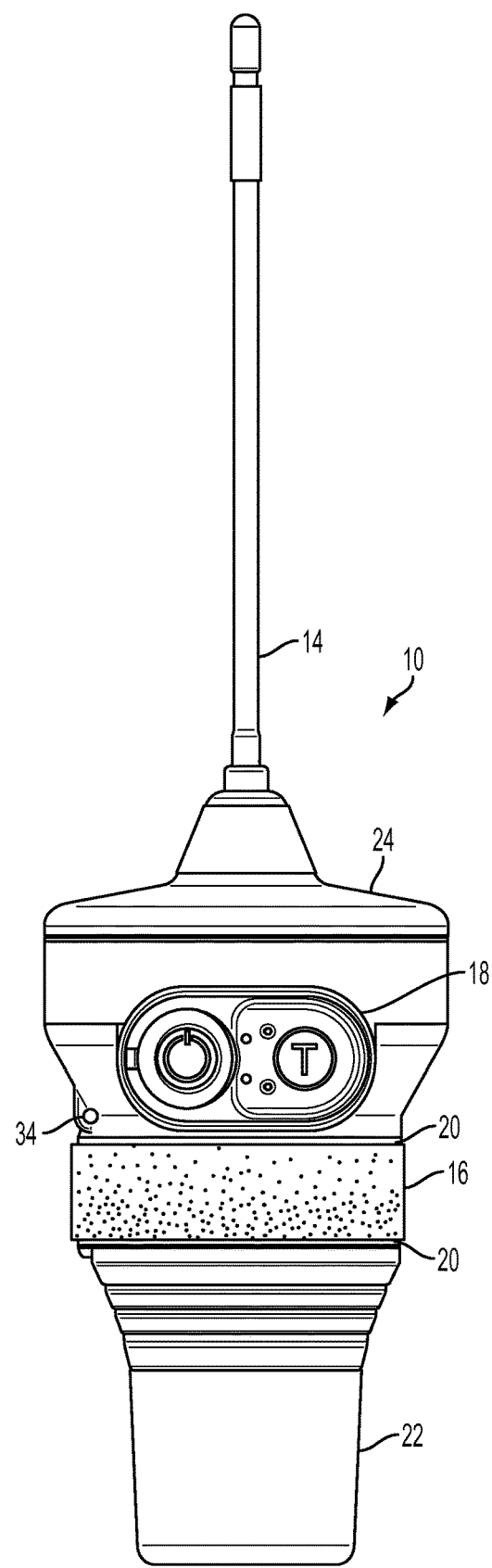
FIG. 6 shows a front elevational view of the invention.

FIG. 6 shows the EPIRB upper housing 24 that has an antenna 14 that connects into an antenna connection. The emergency signal control panel 18 is shown, a spool 20 mounted on the midsection of the EPIRB housing, a carriage strap 16 wrapped about spool 20 and the lower cylindrical EPIRB housing 22.

The overall housing is made of a rigid waterproof plastic material that is sealed to prevent water or moisture from getting inside the device. The electronic circuitry for the GPS and emergency signal transmitters and receivers and battery are located inside the housing and do not form a part of this invention.

When the retention strap 16 and the safety line 26 are not in use, each is stored unobtrusively out of the way around the central housing of the EPIRB housing.

The invention described herein is to allow transport and carriage of an emergency device in emergency conditions in a hands-free or single hands-free mode of operation by the user without impeding the utilitarian function of the emergency device which is to transmit locating signals through the satellite system for rescue purposes.

What we claim is:

1. An emergency position indicating radio beacon (EPIRB) operable in the Cospas Sarsat 406 MHz system having:
   a partially cylindrical waterproof housing;
   a spool for receiving a flexible retention carriage strap mounted to and around said partially cylindrical waterproof housing;

an antenna for transmitting and receiving RF signals connected to said waterproof housing;

internal signal generator and transmitter for creating RF band emergency signals operable in the Cospas-Sarsat 406 MHz international search and rescue system mounted inside said cylindrical waterproof housing and connected to said antenna;

power supply mounted inside said cylindrical waterproof housing and connected to said signal generator and transmitter; and, transmitter on-off switch to connected to said power supply and said transmitter;

a flexible flat retention carriage strap connected to said spool around said EPIRB waterproof housing in a storage position, said carriage strap being sized in length so that a user can engage manually the carriage strap for transporting the EPIRB in a hands-free manner.

2. An emergency position indicating radio beacon (EPIRB) operable in the Cospas-Sarsat 406 MHz international search and rescue system including:

a flexible flat carriage strap spool;

a rigid watertight housing;

an antenna attached to said housing, mounted on the top of said housing;

said rigid housing including a cylindrical body portion that includes said flexible flat carriage strap spool disposed about the exterior body portion of said rigid housing; and an eye for attaching a security cord;

a security cord;

a flexible flat carriage strap connected around said spool in a first storage position;

said flexible flat carriage strap attached at one end by said security cord to said eye mounted on said exterior surface of said rigid body for tightly securing said carriage strap to said rigid housing; and said flexible flat carriage strap sized in length for grasping and attachment around the arm of a user for carriage of the EPIRB with at least one hand free.

3. An EPIRB as in claim 2, including:

a safety line of a predetermined length connected around said flexible flat carriage strap spool beneath said flexible carriage strap in the storage position, said safety line removable from said spool.

4. An EPIRB as in claim 3, wherein:

said spool is mounted to said EPIRB rigid housing cylindrical body portion for storing said flexible flat carriage strap and said safety line together.

5. An EPIRB as in claim 2, including:

said flexible flat carriage strap including a buckle attached at one end of said flexible flat carriage strap and including areas of hook and separate areas of loop fasteners and strategically disposed on one side of said flexible flat carriage strap for looping and attaching portions of said flexible flat carriage strap to each other to form a loop or to tightly wrap said flexible flat carriage strap against itself in a storage position around said rigid housing.

6. An EPIRB as in claim 2, including:

said security cord including a short durable cord for securing said carriage strap to said rigid housing;

said rigid housing eye mounted and extended outwardly from the exterior of said rigid housing, said rigid housing eye sized to receive said security cord short durable cord which is attached to said rigid housing eye, and the opposite end of said security cord short durable cord being attached to one end of said flexible flat carriage strap firmly attaching said carriage strap to said rigid housing.

7. An emergency position indicating radio beacon (EPIRB) having a carriage strap comprising:

Cospas-Sarsat enabled emergency 406 MHz beacon for transmitting emergency signals to a satellite network internationally for search and rescue, said beacon having a waterproof housing; and, a carriage strap connected to said beacon waterproof housing and connected around the housing in the storage position, said carriage strap including a fastener for holding said carriage strap around said beacon in a storage position.

8. A beacon as in claim 7 including:

said carriage strap being flat and flexible;

said carriage strap fastener including a surface portion of said strap on one side having hook fasteners and a second surface portion of said strap on the same side having a loop fastener portion such that when the strap is overlapped back on itself, the loop fastener portion is fastened to the hook fastener portion holding the strap to the beacon in the storage position.

9. A beacon as in claim 8 including:

a buckle attached to one end of said flat strap and looped through a portion of said flat strap for allowing said strap to be overlapped back upon itself to engage the hook and loop fasteners in the storage position.

\* \* \* \* \*